(12) United States Patent
McCarthy (10) Patent No.: US 8,869,031 B1
(45) Date of Patent: Oct. 21, 2014

(54) SCALING INTRO MUSIC

(75) Inventor: Michael McCarthy, Oakland, CA (US)

(73) Assignee: Zynga Inc., San Francisco, CA (US)

(*) Notice: Subject to any disclaimer, the term of this patent is extended or adjusted under 35 U.S.C. 154(b) by 122 days.

(21) Appl. No.: 13/595,716

(22) Filed: Aug. 27, 2012

(51) Int. Cl.
*H04N 21/462* (2011.01)

(52) U.S. Cl.
CPC ................... *H04N 21/4622* (2013.01)
USPC .......................................... 715/727

(58) Field of Classification Search
CPC ............. G10H 2240/016; G11B 27/34; G11B 27/034; H04N 5/4456; H04N 21/4622; H04N 21/47
USPC ................................. 715/716, 727
See application file for complete search history.

(56) References Cited

U.S. PATENT DOCUMENTS

| | | | |
|---|---|---|---|
| 2007/0218992 A1* | 9/2007 | Maehiro et al. | 463/31 |
| 2009/0044686 A1* | 2/2009 | Vasa | 84/609 |
| 2009/0088877 A1* | 4/2009 | Terauchi et al. | 700/94 |

* cited by examiner

*Primary Examiner* — Amy Ng
*Assistant Examiner* — Roland Casillas
(74) *Attorney, Agent, or Firm* — Schwegman Lundberg & Woessner, P.A.

(57) ABSTRACT

A system, a computer readable storage medium storing at least one program, and a computer-implemented method for playing intro music while an online game loads on a client system. One or more intro songs are identified, and the stages of loading are monitored. Once the loading reaches a stage where interactivity between the user and the online game is possible, the currently playing intro song finishes playing while interactivity is permitted, but after the currently playing intro song finishes, the intro music has ended.

19 Claims, 9 Drawing Sheets

SCALING INTRO MUSIC

TECHNICAL FIELD

The present disclosure generally relates to games and applications in general and, in particular embodiments, to computer-implemented, online social games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., FIREFOX®, GOOGLE CHROME®, INTERNET EXPLORER®).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, etc. A player character in an online poker game may be able to play at specific tables, place bets of virtual currency for certain amounts, play or fold certain hands, play in a online poker tournament, etc.

All of these functions require significant amounts of processing power. While many functions can be run on a server, there are many functions that need to be, or at least are better performed, by a client. The client would typically run on a device operated by the user. As such, it is often necessary for the client to load what may be significant amounts or sizes of application files prior to the game being able to run. In other words, it may take a significant amount of time for the client to load the game to a point at which the user can play it. This is exacerbated by the rise in gamers who utilize a mobile device, such as a mobile phone or tablet, as their gaming machine. Such devices have slower processors than laptop computers and desktop computers, increasing the loading time. Additionally, such devices often will connect to the server via a mobile phone data network protocol, such as EDGE, 3G, or 4G, which can be significantly slower than traditional broadband connections. Users can wind up getting bored while waiting for the game to load.

DESCRIPTION OF EXAMPLE EMBODIMENTS

Overview

As described in the background section, users may get bored waiting for a game to load. Music can be played to entertain the user during this time. This music may be referred to as "intro music", to describe the music playing prior to a game being loaded. However, with music an issue arises in that the load time can vary greatly based on the type of client system being utilized. A desktop computer with a broadband connection, for example, will load a game much faster than a mobile phone with a 3G connection. As such, the transition between the intro music and the rest of the game (which may involve different music, i.e., "game music", or no music at all) can be abrupt. If the intro music is a song, for example, the game may finish loading 30 seconds before the end of the song, and the song would then cut off in favor of the game music or silence. Users have a visceral reaction to abruptly ending the song, especially in key parts of a song. There is a tendency for the user to feel a sense of a lack of completion or unease even when a song is cut off at a key part. There are even some types of notes and chords that express a tense or anticipatory emotion that if cut off at that time produce a sort of anxiety for the user. For example, a suspended chord in music is one in which a major third is replaced with a perfect fourth. Typically such a chord is followed immediately by the normal version of the chord, with the major third instead of the perfect fourth. If such a traditional version of the chord does not follow, because for example the song is cut off or a new song started, the user will feel that sense of lack of completion/anxiety. A similar occurrence can occur to a lesser degree with minor chords.

While in some cases musicians find it desirable to elicit those types of negative emotions, it can be detrimental to game play, especially if the game is a "calm" game that is intended to relax the user. Nevertheless, even if a game designer wished to elicit those types of emotions, it would be better if that was done voluntarily and under the game designer's own schema than forced upon the game designer by a random load time.

In an example embodiment, intro music can be scaled in order to ensure that the transition between load time and game time is not an abrupt experience for the use. For example, when the game has transitioned from load time, the intro music may be allowed to complete prior to ending. In such embodiments, the game may actually be started before the intro music has completed playing, allowing the intro music to complete prior to transitioning to game music or silence. Furthermore, in such embodiments it may be beneficial to create a playlist of multiple shorter songs, which can be played in a loop or other sequence, so as to ensure that the intro music does not require a significant amount of time to complete playing once the game play begins.

These and other example embodiments are described, by way of example, in further detail below.

Example System

Figure 1:
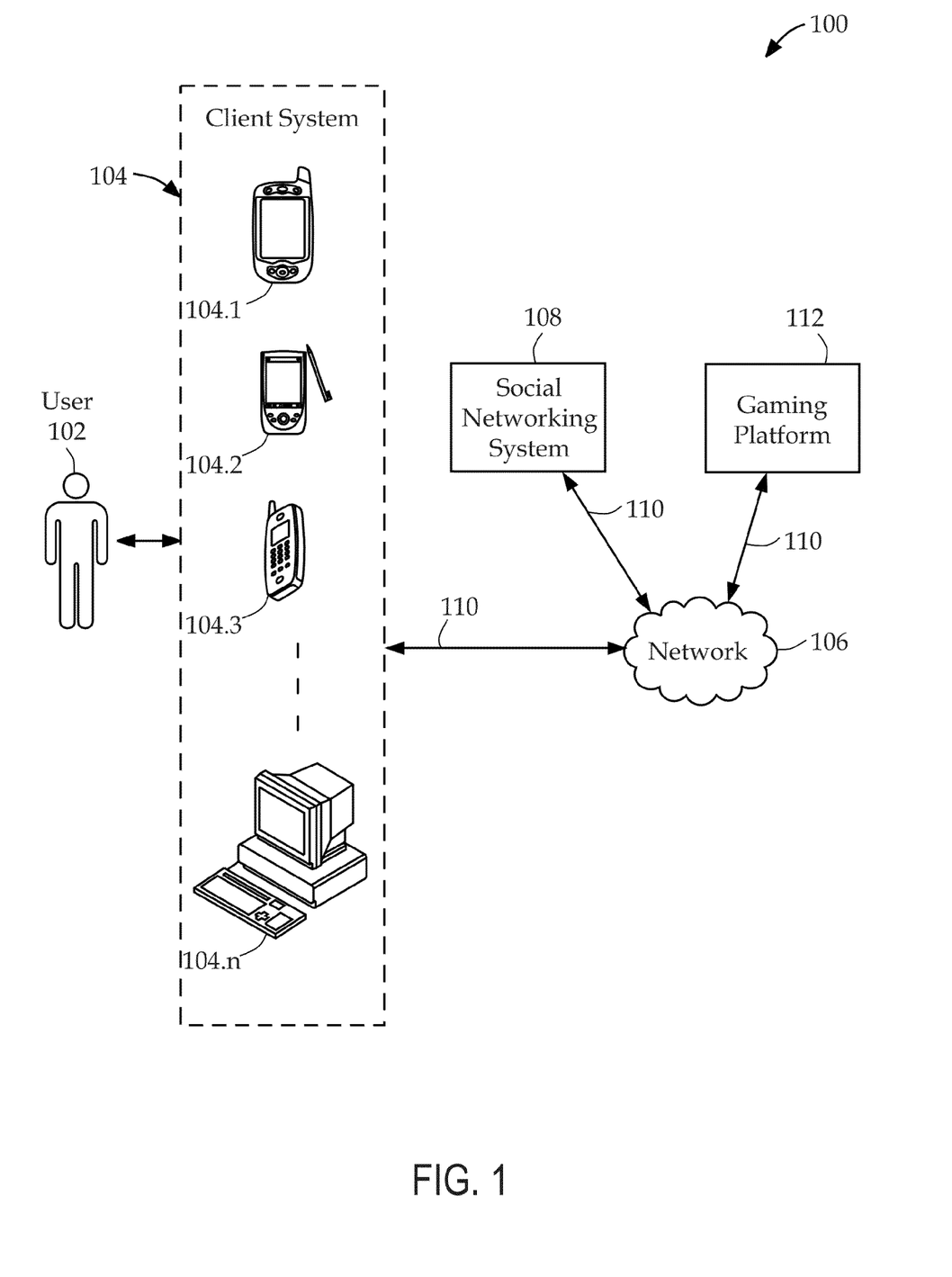
FIG. 1 illustrates an example of a system for implementing various disclosed embodiments.

FIG. 1 illustrates an example of a system for implementing various disclosed embodiments. In particular embodiments, a system 100 comprises a user 102, a social networking system 108, a gaming platform 112, a client system 104, and a network 106. The components of the system 100 can be connected to each other in any suitable configuration, using any suitable type of connection. The components may be connected directly or over a network 106, which may be any suitable network. For example, one or more portions of network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

The social networking system 108 is a network-addressable computing system that can host one or more social graphs. The social networking system 108 can generate, store, receive, and transmit social networking data. The social networking system 108 can be accessed by the other components of the system 100 either directly or via the network 106. The gaming platform 112 is a network-addressable computing system that can host one or more online games. The gaming platform 112 can generate, store, receive, and transmit game-related data, such as, for example, game account data, game input, game state data, and game displays. The gaming platform 112 can be accessed by the other components of the system 100 either directly or via the network 106. The user 102 may use the client system 104 to access, send data to, and receive data from the social networking system 108 and the gaming platform 112. The client system 104 can access the social networking system 108 or the gaming platform 112 directly, via the network 106, or via a third-party system. As an example and not by way of limitation, the client system 104 may access the gaming platform 112 via the social networking system 108. The client system 104 can be any suitable computing device, such as a touchscreen smartphone 104.1, tablet computer 104.2, cellular phone 104.3, personal computer 104.4, etc.

Although FIG. 1 illustrates just one user 102, social network system 108, gaming platform 112, client system 104, and network 106, this disclosure contemplates any suitable number of users 102, social network systems 108, gaming platforms 112, client systems 104, and networks 106. As an example and not by way of limitation, the system 100 may include one or more gaming platforms 112 and no social networking systems 108. As another example and not by way of limitation, the system 100 may include a system that comprises both the social networking system 108 and the gaming platform 112.

The components of the system 100 may be connected to each other using any suitable connections 110. For example, the suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. The connections 110 need not necessarily be the same throughout the system 100. One or more first connections 110 may differ in one or more respects from one or more second connections 110. Although FIG. 1 illustrates particular connections between the user 102, the social network system 108, the gaming platform 112, the client system 104, and the network 106, this disclosure contemplates any suitable connections between the user 102, the social network system 108, the gaming platform 112, the client system 104, and the network 106. As an example and not by way of limitation, in particular embodiments, the client system 104 may have a direct connection to social networking system the 108 or gaming platform the 112, bypassing the network 106.

Each client system 104 may take actions to load the game. These actions may be prompted by user actions (e.g., user selecting a game to play). Alternatively, these actions may be performed automatically (e.g., the user sets up the client system 104 to automatically load the game each time the client system 104 is booted). These actions may be referred to as load actions and the time it takes for these actions to complete may be referred to as load time.

In one example, the load actions may comprise seven distinct stages, labeled $T_0$ through $T_6$.

$T_0$ involves the steps when the user's client software, such as a browser, loads an outer iframe (or index page). This represents the first point of contact with the end user. The user may only see a blank page at this point.

$T_1$ involves the steps when the user's client software loads an inner iframe, which in one example is a flash container. At this point, the user may see tabs related to the game, a zbar (a toolbar showing game status and information), and a white inner iframe.

At $T_2$, the flash container's iframe is Document Object Model (DOM) complete, namely it is completely rendered and javascript is executing.

At $T_3$, a preloader has been downloaded and is executing. At this point the user sees preloader artwork with a progress bar at 0%.

At $T_4$, the main game file (perhaps in the form of an Shockwave Flash, or SWF file) has been loaded. At this point, the progress bar may show somewhere in the middle of 0% and 100%, for example 50%.

At $T_5$, the user's game state has been loaded and a minimal number of assets have been. The user at this point is allowed to begin interactivity, such as clicking on items on the game board.

At $T_6$, all assets that comprise the user's game board have been downloaded and rendered in the game.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each user 102 controls one or more player characters (PCs). The game engine controls all other aspects of the game, including non-player characters (NPCs), and in-game objects. The game engine also manages game state, including player character state for currently active (online) and inactive (offline) players.

An online game can be hosted by gaming platform 112, which can be accessed using any suitable connection with a suitable client system 104. A user 102 may have a game account on the gaming platform 112, wherein the game account can contain a variety of information associated with the user (e.g., the player's personal information, financial information, purchase history, player character state, game state). In some embodiments, a user may play multiple games on the gaming platform 112, which may maintain a single game account for the user with respect to all the games, or multiple individual game accounts for each game with respect to the user. In some embodiments, the gaming platform 112 can assign a unique identifier to each user 102 of an online game hosted on the gaming platform 112. The gaming platform 112 can determine that a user 102 is accessing the online game by reading the user's cookies, which may be appended to HTTP requests transmitted by the client system 104, and/or by the user 102 logging onto the online game.

In particular embodiments, the user 102 may access an online game and control the game's progress via the client system 104 (e.g., by inputting commands to the game at the client device). Client system 104 can display the game interface, receive inputs from the user 102, transmitting user inputs or other events to the game engine, and receive instructions from the game engine. The game engine can be executed on any suitable system (such as, for example, the client system 104, the social networking system 108, or the gaming platform 112). As an example and not by way of limitation, the client system 104 can download client components of an online game, which are executed locally, while a remote game server, such as gaming platform 112, provides backend support for the client components and may be responsible for maintaining application data of the game, processing the inputs from the user, updating and/or synchronizing the game state based on the game logic and each input from the user, and transmitting instructions to the client system 104. As another example and not by way of limitation, each time the user 102 provides an input to the game through the client system 104 (such as, for example, by typing on the keyboard or clicking the mouse of the client system 104), the client components of the game may transmit the user's input to the gaming platform 112.

Intro Music

As described above, the intro music played while loading a game can be implemented in a manner that provides a smooth transition between game loading and game play. Music itself can be played by the client system using a number of different techniques. In one example embodiment, the music is stored as one or more media files including digital audio data. Such files might include, for example, MP3 files, however other file formats are used as well. Examples of other such file formats include way, AIFF, AU, FLAC, APE, EV, RRA, ATRAC, m4a, MPEG-4 SLS, MPEG-4 ALS, MPEG-4DST, Windows WMA, SHN, Vorbis, Musepack, AAC, and ATRAC. In another example embodiment, another type of music file rather than an actual digital audio file may be used, such as a MIDI file.

The location where the song files are stored can also vary based upon implementation. In one example implementation, the song files are stored on the client system. In another example implementation, the song files are stored on a server system, such as the gaming platform 112 of FIG. 1. In the case where the song files are stored on a server system, the songs can either be streamed to the client system for real-time playing, or can be transferred as a beginning stage of the loading process. Of course, embodiments are possible where mixtures of songs stored on the client system and server system are used.

Each song may be stored as an individual file in one (or more) of the above file formats. Intro music can then be thought of as some sequence of one or more songs stored in the individual files. As described above, in an example embodiment, the intro music is designed to be a sequence of at least 2 songs, with each song being of a relatively short length in order to minimize the amount of time that is necessary to continue playing the song until its end once gameplay begins. In an example embodiment, songs are designed so as to be about 30 seconds in length.

Keeping songs at a relatively short length may also provide advantages for brand recognition in some cases. A catchy, but short, song can be repeated multiple times throughout the intro, leading players to associate the song, or at least a portion thereof, with the game. Thus, in addition to aiding in the implementation of the aspect of example embodiments involving improving the transition from intro music to game music, there can be additional commercial advantages to keeping songs short. Additionally, smaller files may, under certain circumstances, be more efficient for transferring via the Internet, as the files can potentially be routed via different paths simultaneously.

Figure 2:
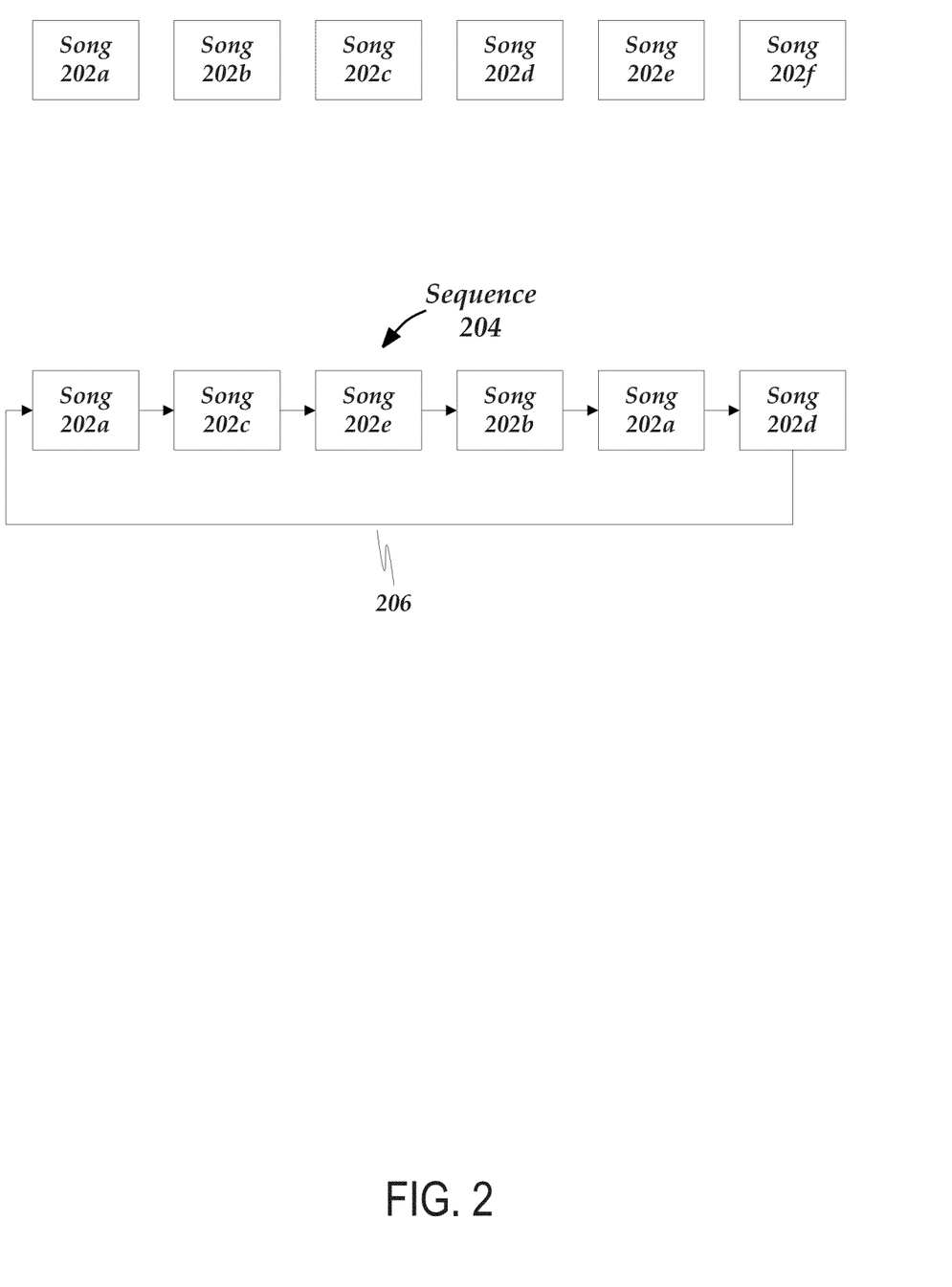
FIG. 2 is a diagram illustrating a number of different songs in accordance with an example embodiment.

The sequence of songs played during the intro music can vary based on implementation. FIG. 2 is a diagram illustrating a number of different songs in accordance with an example embodiment. Here, each song 202a-202f is about 30 seconds in length. The game designer can make certain assumptions about the length of time that the game will typically take to load (although these assumptions may vary wildly as described earlier). Assume, for example, the game takes 30-90 seconds to load on the typical systems. The game designer may attempt to design a sequence that allow for some leeway for long-loading time circumstances. As such, the designer may attempt to create an intro music sequence that is about 3 minutes long. This sequence can be ordered in any manner, including repeating certain songs while not repeating otherwise (outside of a general intro music loop, described later). For example, a particular sequence may be Song 202a, Song 202c, Song 202e, Song 202b, Song 202a, Song 202d. This is depicted as sequence 204 in FIG. 2. In such instances, it may be desirable to ensure that the transitions between consecutive songs are smooth. For example, it may be desirable to ensure that the songs are generally in the same key (or at least that key transitions occur in a manner that appears smooth to the user) and that the last note played in one song is the same or at least compatible with the first note played in the next song. For example, if the sequence in FIG. 2 is used, it may be desirable for the game designer to ensure that the last note of Song 202a is the same or compatible with the first note in both Songs 202c and 202d, since both Songs 202c and 202d immediately follow song 202a in the sequence. The first note of song 202a should then be the same or compatible with the last note of song 202b (which it immediately follows), as well as song 202d (which it follows if a loop occurs, as described below).

If, for some reason, the game still has not loaded when the last song in the sequence has finished, the sequence can be looped. As such, in the above example, if Song 202d has completed and the game still has not finished loading, the intro music can begin playing again at Song 202a. This is depicted by arrow 206 in FIG. 2.

Figure 3:
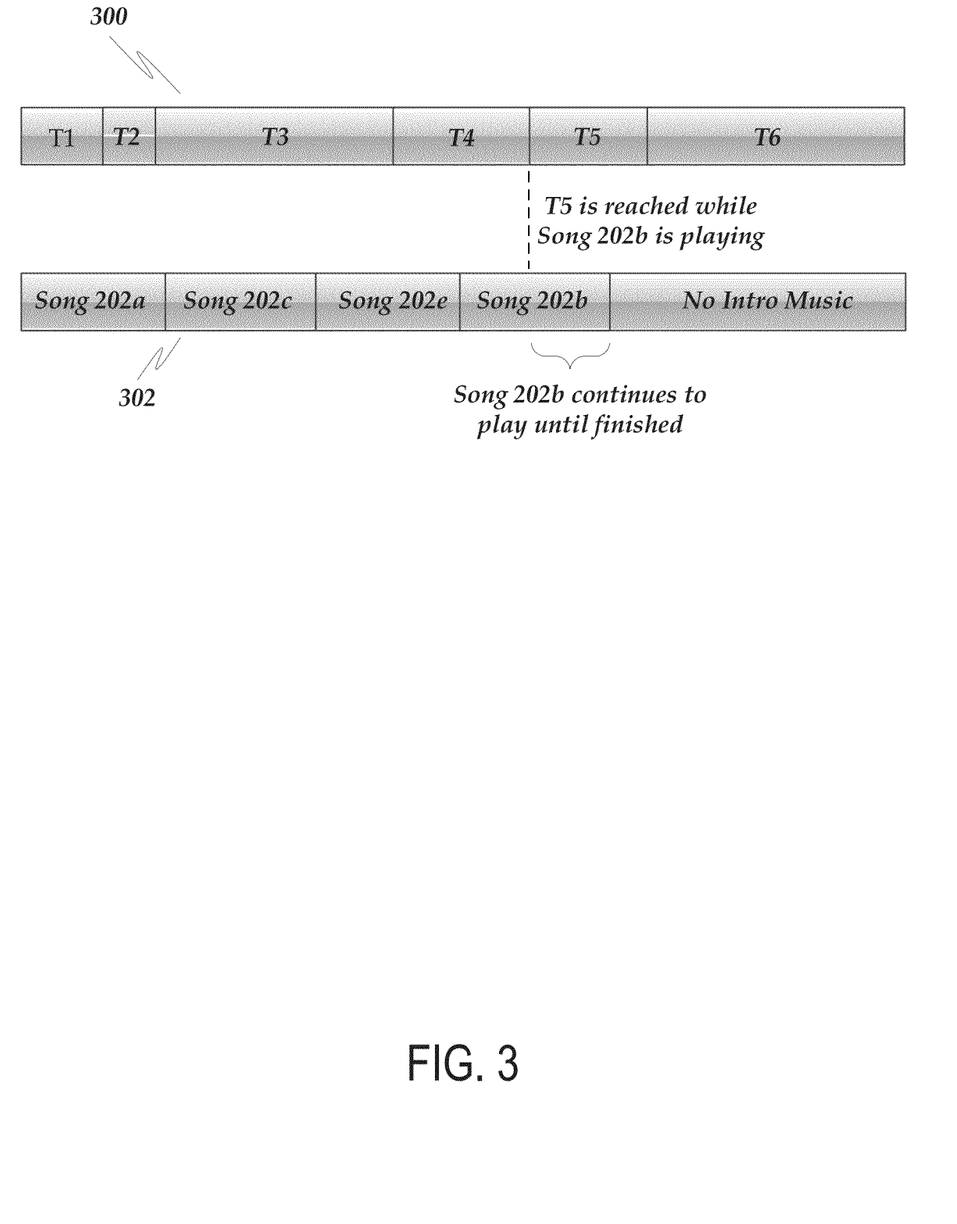
FIGS. 3-4 illustrate examples of intro music completions when loading an online game.

FIG. 3 then depicts operation of the intro music in accordance with an example embodiment. Here, the intro music sequence of FIG. 2 is utilized. Timeline 300 depicts the progression of game loading states, from T1 through T6. Timeline 302 depicts the playing of intro music. When T5 is reached, it can be seen that Song 202b is still playing. As also can be seen in timeline 302, Song 202b then will continue to play until it finishes.

Figure 4:
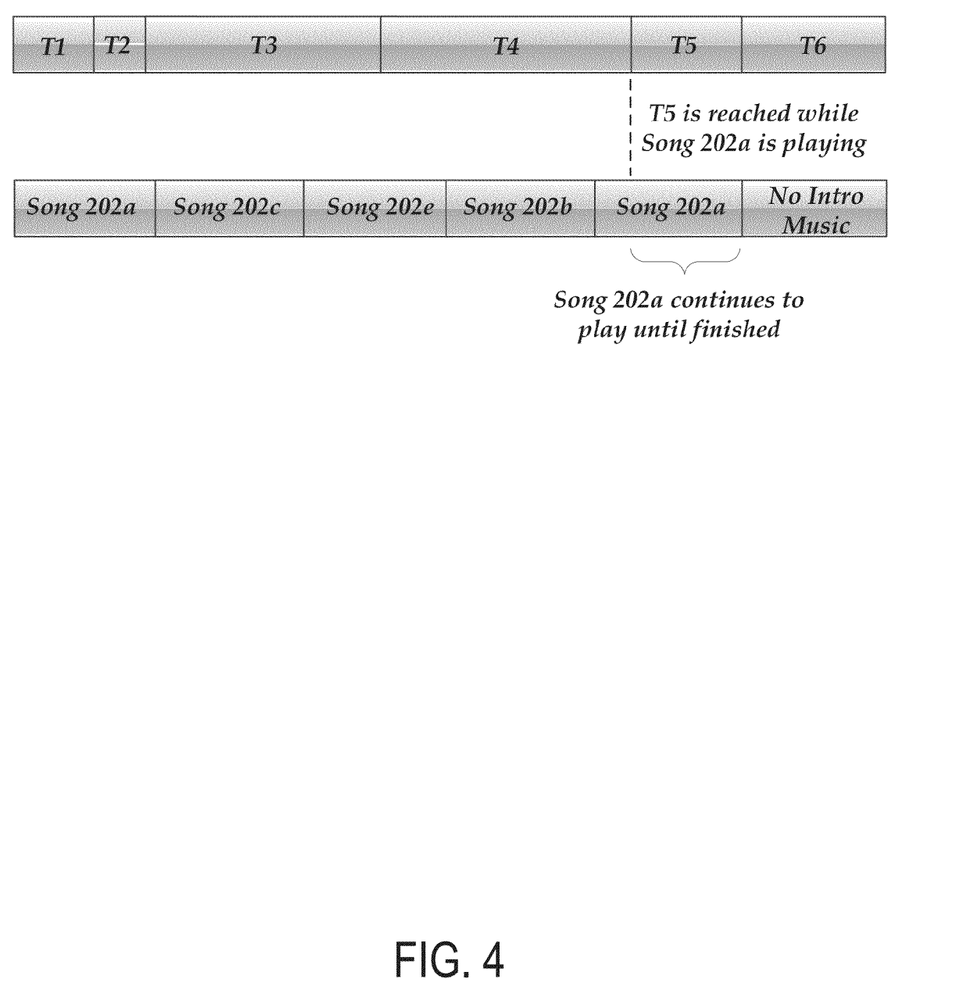

FIG. 4 then depicts how the same could provide a different result if T5 occurs later, such as when song 202a is playing.

It should be noted that while the above example shows a fixed sequence defined by the game designer, other embodiments can be utilized that operate with something other than a fixed sequence. In one example, songs from a predefined group of song files can be randomly played. In such an instance, it may be preferable to create the songs in a manner such that there are smooth transitions between all possible combinations of songs. In other words, it may be preferable to ensure that every song has a final note that matches or is compatible with a first note, in order to ensure that the songs can be picked in any order and appear consistent.

In another example, the sequence may be dynamically changed. For example, the game designer could have multiple different sequences defined, and the system could randomly select one of the sequences when the user selects the game to be loaded. In another example, the sequence or song selection can vary based on environmental factors, such as the state of the system, the time of day, weather conditions, location of the client system, etc. For example, the intro music could then differ (in song selection and/or sequence) if the user is at home and it is sunny than if the user is at work and it is raining.

In another example embodiment, the intro music (in song selection and/or sequence) may vary based on the state of the loading. As described above, the loading of the game may include multiple states, one example being states T1-T5, with T1 representing the beginning of the loading process and T5 representing when enough of the game has loaded for interactivity to being (remaining stage T6 still being performed after but with the user able to interact). Also as described above, stage T5 is the stage at which the game can be considered to be "loaded" and the transition between intro music and game music (if any) begun.

Therefore, in this example, the intro music can vary when the states transition between states T1-T5. For example, the music may change when or around when stage T4 is reached. This may signal to the user that the loading is almost complete. In one example embodiment, the music may be designed to elicit more anticipation as the states get closer to stage T5, such as by increasing the number of beats per minute of the song playing (i.e., shifting to more up tempo music). This may, consciously or unconsciously, signal to the user that the game is almost loaded.

Figure 5:
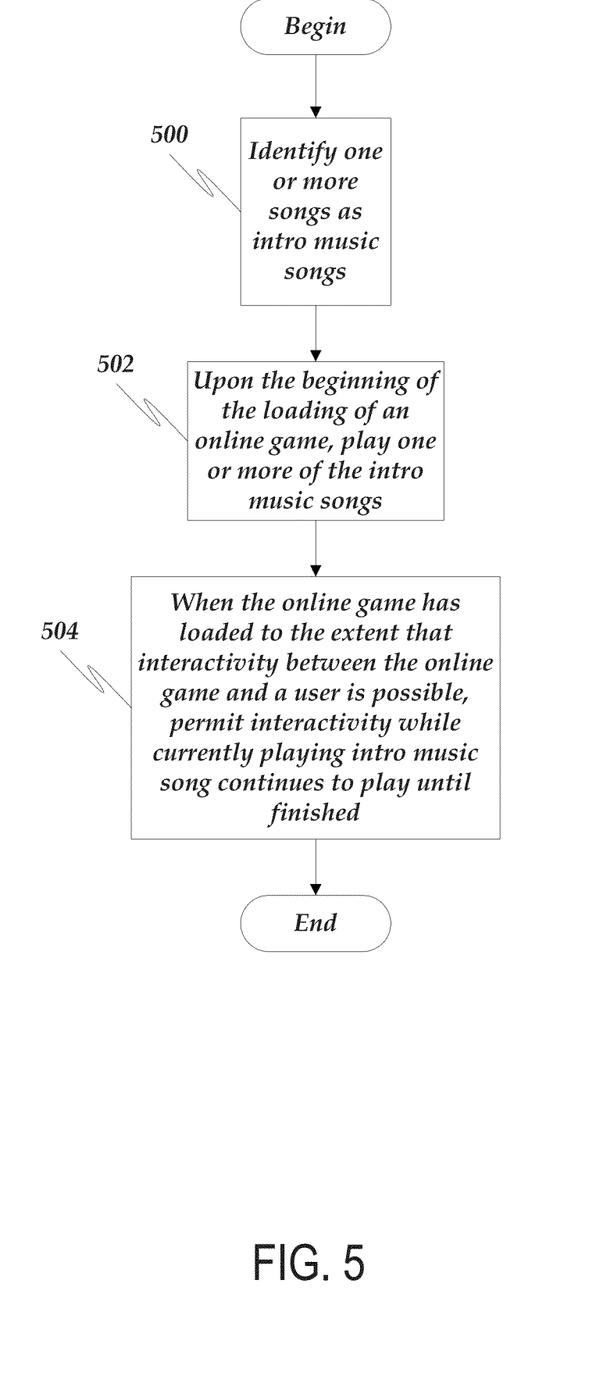
FIG. 5 is a flow chart illustrating an example process flow.

FIG. 5 is a flow diagram illustrating a method in accordance with an example embodiment. At 500, one or more songs are identified as intro music songs. As described above, there are a number of different ways this identification can occur, including an identification of a sequence of songs, either predetermined or dynamically determined at runtime. At 502, upon the beginning of the loading of an online game, a client system can be caused to play one or more intro music songs. At 504, when the online game has loaded to the extent that interactivity between the online game and a user of the client system is possible, interactivity is permitted to be used while a currently playing song from the intro music songs continue to play until it has finished.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each user.

Referring back to FIG. 1, in particular embodiments, the user 102 may access particular game instances of an online game. A game instance is copy of a specific game play area that is created during runtime. In particular embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific users) or non-exclusive (i.e., accessible by any user). In particular embodiments, a game instance is populated by one or more player characters controlled by one or more users 102 and one or more in-game objects controlled by the game engine. When accessing an online game, the game engine may allow the user 102 to select a particular game instance to play from a plurality of game instances. Alternatively, the game engine may automatically select the game instance that the user 102 will access. In particular embodiments, an online game comprises only one game instance that all users 102 of the online game can access.

In particular embodiments, a specific game instance may be associated with one or more specific users. A game instance is associated with a specific user when one or more game parameters of the game instance are associated with the specific user. As an example and not by way of limitation, a game instance associated with a first user may be named "First User's Play Area." This game instance may be populated with the first user's PC and one or more in-game objects associated with the first user. In particular embodiments, a game instance associated with a specific user may only be accessible by that specific user. As an example and not by way of limitation, a first user may access a first game instance when playing an online game, and this first game instance may be inaccessible to all other users. In other embodiments, a game instance associated with a specific user may be accessible by one or more other users, either synchronously or asynchronously with the specific user's game play. As an example and not by way of limitation, a first user may be associated with a first game instance, but the first game instance may be accessed by all first-degree friends in the first user's social network. In particular embodiments, the game engine may create a specific game instance for a specific user when that user accesses the game. As an example and not by way of limitation, the game engine may create a first game instance when a first user initially accesses an online game, and that same game instance may be loaded each time the first user accesses the game. As another example and not by way of limitation, the game engine may create a new game instance each time a first user accesses an online game, wherein each game instance may be created randomly or selected from a set of predetermined game instances. In particular embodiments, the set of in-game actions available to a specific user may be different in a game instance that is associated with that user compared to a game instance that is not associated with that user. The set of in-game actions available to a specific user in a game instance associated with that user may be a subset, superset, or independent of the set of in-game actions available to that user in a game instance that is not associated with him. As an example and not by way of limitation, a first user may be associated with Blackacre Farm in an online farming game. The first user may be able to plant crops on Blackacre Farm. If the first user accesses game instance associated with another user, such as Whiteacre Farm, the game engine may not allow the first user to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, the social networking system 108 or the gaming platform 112). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by the gaming platform 112, which is managed by the game operator. In other embodiments, the social graph is part of a social networking system 108 managed by a third-party (e.g., FACEBOOK®, FRIENDSTER®, MYSPACE®). In yet other embodiments, the player 102 has a social network on both the gaming platform 112 and the social networking system 108, wherein the player 102 can have a social network on the gaming platform 112 that is a subset, superset, or independent of the player's social network on the social networking system 108. In such combined systems, the gaming platform 112 can maintain social graph information with edge type attributes that indicate whether a given friend is an "in-game friend," an "out-of-game friend," or both. The various embodiments disclosed herein are operable when the social graph is managed by the social networking system 108, the gaming platform 112, or both.

Figure 6:
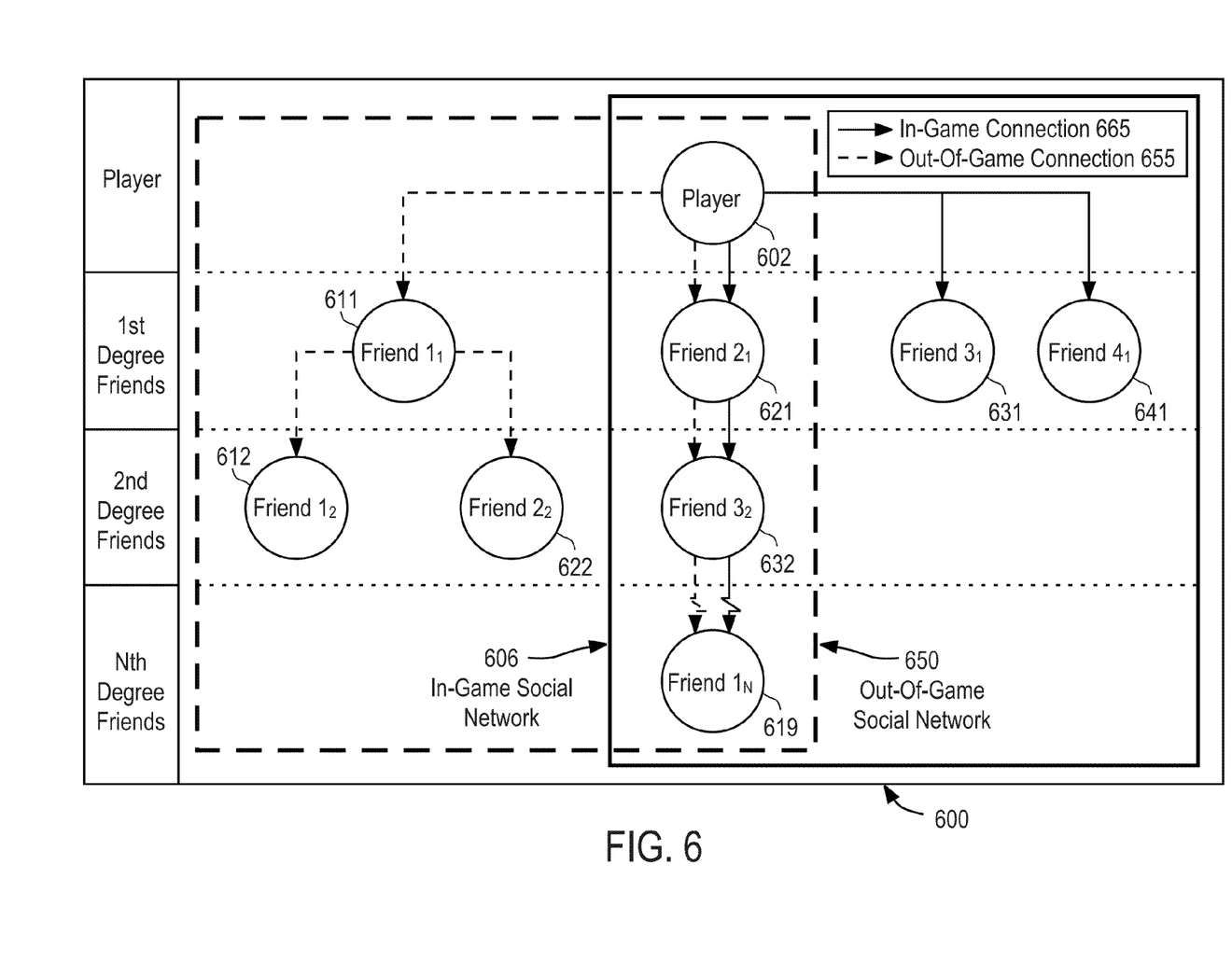
FIG. 6 illustrates an example social network.

FIG. 6 shows an example of a social network within a social graph. As shown, The user 621 can be associated, connected or linked to various other users, or "friends," within the social network 650. These associations, connections or links can track relationships between users within the social network 650 and are commonly referred to as online "friends" or "friendships" between users. Each friend or friendship in a particular user's social network within a social graph is commonly referred to as a "node." For purposes of illustration and not by way of limitation, the details of the social network 650 will be described in relation to the user 202. As used herein, the terms "player" and "user" can be used interchangeably and can refer to any user or character in an online multiuser game system or social networking system. As used herein, the term "friend" can mean any node within a player's social network.

As shown in FIG. 6, The user 602 has direct connections with several friends. When the user 621 has a direct connection with another individual, that connection is referred to as a first-degree friend. In social network 650, the user 602 has two first-degree friends. That is, the user 602 is directly connected to Friend $1_1$ 611 and Friend $2_1$ 621. In a social graph, it is possible for individuals to be connected to other individuals through their first-degree friends (i.e., friends of friends). As described above, each edge required to connect a user to another user is considered the degree of separation. For example, FIG. 6 shows that the user 602 has three second-degree friends to which he is connected via his connection to his first-degree friends. Second-degree Friend $1_2$ 612 and Friend $2_2$ 622 are connected to the user 602 via his first-degree Friend $1_1$ 611. The limit on the depth of friend connections, or the number of degrees of separation for associations, that the user 602 is allowed is typically dictated by the restrictions and policies implemented by the social networking system 108.

In various embodiments, the user 602 can have Nth-degree friends connected to him through a chain of intermediary degree friends as indicated in FIG. 6. For example, Nth-degree Friend $1_N$ 619 is connected to the user 602 via second-degree Friend $3_2$ 632 and one or more other higher-degree friends. Various embodiments may take advantage of and utilize the distinction between the various degrees of friendship relative to Player 602.

In particular embodiments, a user (or player character) can have a social graph within an online multiplayer game that is maintained by the game engine and another social graph maintained by a separate social networking system. FIG. 6 depicts an example of in-game social network 606 and out-of-game social network 650. In this example, the user 602 has out-of-game connections 655 to a plurality of friends, forming an out-of-game social network 650. Here, Friend $1_1$ 611 and Friend $2_1$ 621 are first-degree friends with the user 602 in his out-of-game social network 650. The user 601 also has in-game connections 665 to a plurality of players, forming an in-game social network 606. Here, Friend $2_1$ 621, Friend $3_1$ 631, and Friend $4_1$ 641 are first-degree friends with the user 602 in his in-game social network 660. In some embodiments, it is possible for a friend to be in both the out-of-game social network 650 and the in-game social network 660. Here, Friend $2_1$ 621 has both an out-of-game connection 655 and an in-game connection 665 with Player 602, such that Friend $2_1$ 621 is in both the user 601's in-game social network 606 and the user 602's out-of-game social network 650.

As with other social networks, the user 602 can have second-degree and higher-degree friends in both his in-game and out of game social networks. In some embodiments, it is possible for the user 602 to have a friend connected to him both in his in-game and out-of-game social networks, wherein the friend is at different degrees of separation in each network. For example, if Friend $2_2$ 622 had a direct in-game connection with the user 602, Friend $2_2$ 622 would be a second-degree friend in the user 602's out-of-game social network, but a first-degree friend in the user 602's in-game social network. In particular embodiments, a game engine can access the in-game social network 606, the out-of-game social network 650, or both.

In particular embodiments, the connections in a user's in-game social network can be formed both explicitly (e.g., users must "friend" each other) and implicitly (e.g., system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Data Flow

Figure 7:
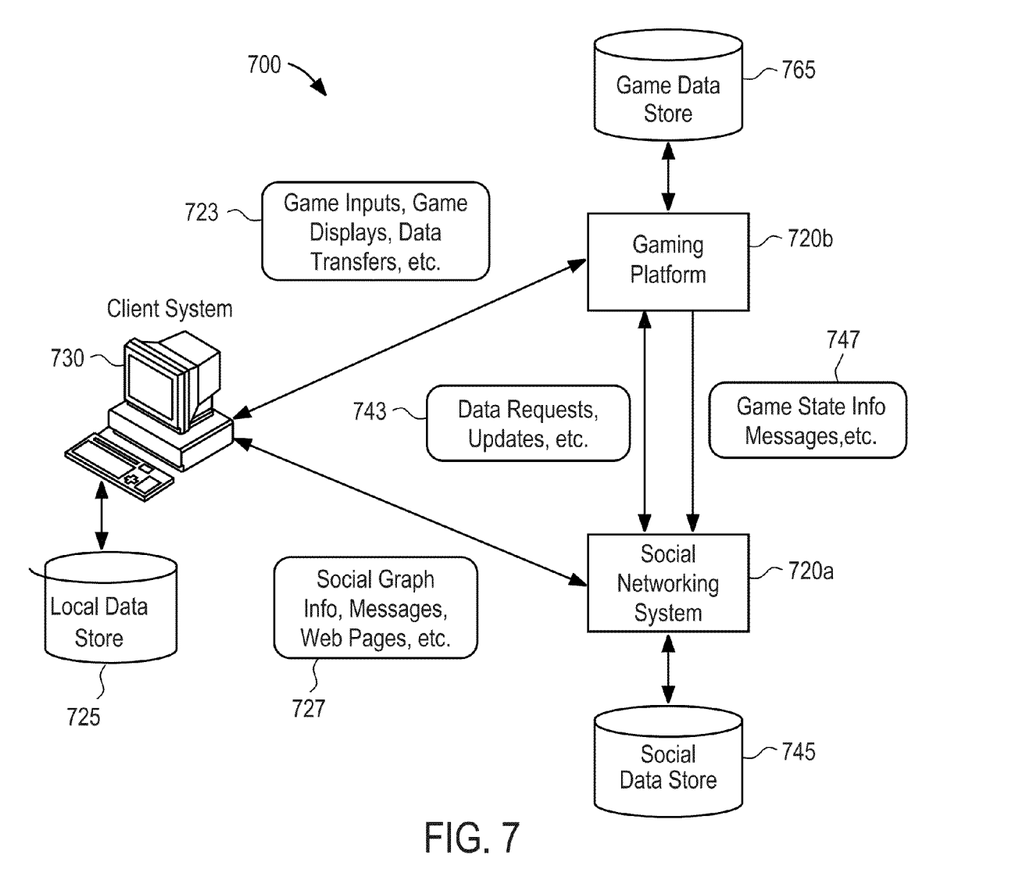
FIG. 7 illustrates an example data flow in a system.

FIG. 7 illustrates an example data flow between example components of an example system 700. One or more of the components of the example system 700 may correspond to one or more of the components of the example gaming environment 100. In some embodiments, the system 700 includes a client system 730, a social networking system 720a, and a gaming platform 720b. The components of the system 700 can be connected to each other in any suitable configuration, using any suitable type of connection. The components may be connected directly or over any suitable network. The client system 730, the social networking system 720a, and the gaming platform 720b may have one or more corresponding data stores such as the local data store 725, the social data store 745, and the game data store 765, respectively.

The client system 730 may receive and transmit data 723 to and from the gaming platform 720b. This data can include, for example, a web page, a message, a game input, a game display, a HTTP packet, a data request, transaction information, and other suitable data. At some other time, or at the same time, the gaming platform 720b may communicate data 743, 746 (e.g., game state information, game system account information, page info, messages, data requests, updates) with other networking systems, such as the social networking system 720a (e.g., FACEBOOK, MYSPACE). The client system 730 can also receive and transmit data 726 to and from the social networking system 720a. This data can include, for example, web pages, messages, social graph information, social network displays, HTTP packets, data requests, transaction information, updates, and other suitable data.

Communication between the client system 730, the social networking system 720a, and the gaming platform 720b can occur over any appropriate electronic communication medium or network using any suitable communications protocols. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the gaming platform 720b, the BLOB containing the game state for the instance corresponding to the user may be transmitted to the client system 730 for use by a client-side executed object to process. In some embodiments, the client-side executable is a FLASH-based game, which can de-serialize the game state data in the BLOB. As a user plays the game, the game logic implemented at the client system 730 maintains and modifies the various game state parameters locally. The client-side game logic may also batch game events, such as mouse clicks, and transmit these events to the gaming platform 720b. Gaming platform 720b may itself operate by retrieving a copy of the BLOB from a database or an intermediate memory cache (memcache) layer. The gaming platform 720b can also de-serialize the BLOB to resolve the game state parameters and execute its own game logic based on the events in the batch file of events transmitted by the client to synchronize the game state on the server side. The gaming platform 720b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 730. For example, a client application downloaded to the client system 730 may operate to serve a set of web pages to a user. As another example, a virtual game may be an animated or rendered game executable as a stand-alone application or within the context of a webpage or other structured document. In some embodiments, the virtual game is implemented using ADOBE FLASH®-based technologies. As an example, a game may be fully or partially implemented as a SWF object that is embedded in a web page and executable by a Flash media user plug-in. In some embodiments, one or more described web pages is associated with or accessed by the social networking system 720*a*. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 730, either caused by an action of a game user or by the game logic itself, the client system 730 may need to inform the gaming platform 720*b* of the update. For example, if the game is a farming game with a harvest mechanic (such as ZYNGA FARMVILLE®), an event can correspond to a user clicking on a parcel of land to harvest a crop. In such an instance, the application event data may identify an event or action (e.g., harvest) and an object in the game to which the event or action applies.

In some embodiments, one or more objects of a game are represented as ADOBE FLASH® objects. Flash may manipulate vector and raster graphics, and supports bidirectional streaming of audio and video. "Flash" may mean the authoring environment, the user, or the application files. In some embodiments, the client system 730 may include a Flash client. The Flash client may be configured to receive and run Flash application or game object code from any suitable networking system (such as, for example, the social networking system 720*a* or the gaming platform 720*b*). In some embodiments, the Flash client is run in a browser client executed on the client system 730. A user can interact with Flash objects using the client system 730 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 730, the Flash client may send the events that caused the game state changes to the in-game object to the gaming platform 720*b*. However, to expedite the processing and hence the speed of the overall gaming experience, the Flash client may collect a batch of some number of events or updates into a batch file. The number of events or updates may be determined by the Flash client dynamically or determined by the gaming platform 720*b* based on server loads or other factors. For example, client system 730 may send a batch file to the gaming platform 720*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 730, the gaming platform 720*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, gaming platform 720*b* may retrieve the corresponding BLOB from the database to determine the most-recent values of the game-related data. In some embodiments, while a user is playing the virtual game, the gaming platform 720*b* also loads the corresponding BLOB into a memory cache so that the game system may have faster access to the BLOB and the game-related data contained therein.

Figure 8:
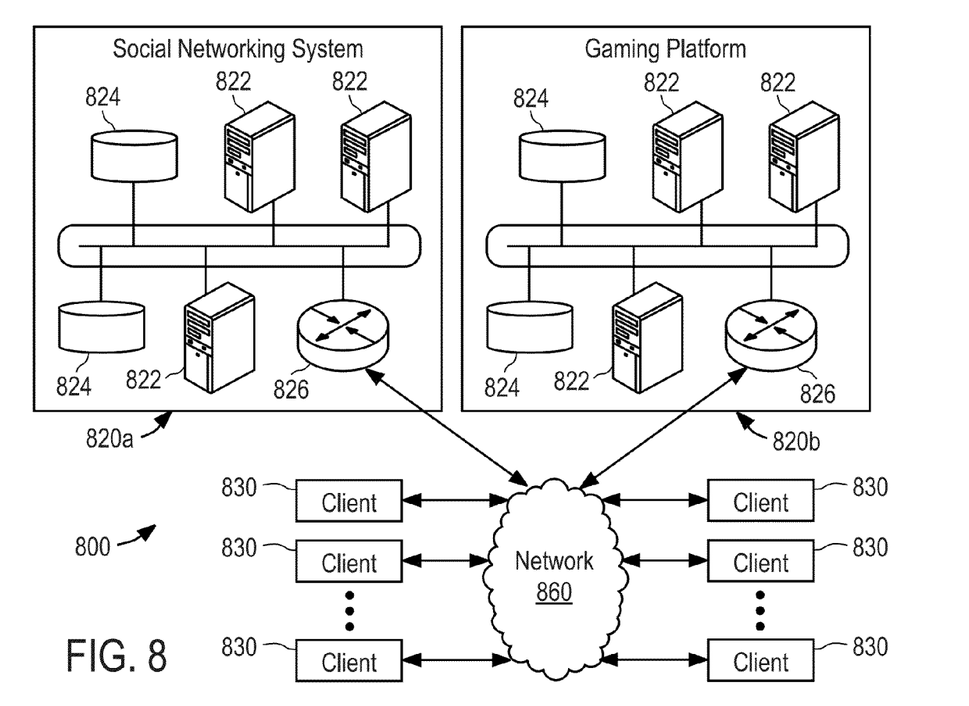
FIG. 8 illustrates an example network environment.

Various embodiments may operate in a wide area network environment, such as the Internet, including multiple network addressable systems. FIG. 8 illustrates an example network environment 800, in which various example embodiments may operate. Network cloud 860 generally represents one or more interconnected networks, over which the systems and hosts described herein can communicate. The network cloud 860 may include packet-based wide area networks (such as the Internet), private networks, wireless networks, satellite networks, cellular networks, paging networks, and the like. As FIG. 8 illustrates, various embodiments may operate in a network environment 800 comprising one or more networking systems, such as a social networking system 820*a*, a gaming platform 820*b*, and one or more client systems 830. The components of the social networking system 820*a* and the gaming platform 820*b* operate analogously; as such, hereinafter they may be referred to simply as the networking system 820. The client systems 830 are operably connected to the network environment 800 via a network service provider, a wireless carrier, or any other suitable means.

The networking system 820 is a network addressable system that, in various example embodiments, comprises one or more physical servers 822 and data stores 824. The one or more physical servers 822 are operably connected to the computer network cloud 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 822 may host functionality directed to the operations of the networking system 820. Hereinafter, the servers 822 may be referred to as server 822, although the server 822 may include numerous servers hosting, for example, the networking system 820, as well as other content distribution servers, data stores, and databases. The data store 824 may store content and data relating to, and enabling, operation of, the networking system 820 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, the data store 824 corresponds to one or more of a variety of separate and integrated databases, such as relational databases and object-oriented databases that maintain information as an integrated collection of logically related records or files stored on one or more physical systems. Structurally, the data store 824 may generally include one or more of a large class of data storage and management systems. In some embodiments, the data store 824 may be implemented by any suitable physical system(s) including components, such as one or more database servers, mass storage media, media library systems, storage area networks, data storage clouds, and the like. In one example embodiment, the data store 824 includes one or more servers, databases (e.g., MySQL), and/or data warehouses. The data store 824 may include data associated with different networking system 820 users and/or client systems 830.

The client system 830 is generally a computer or computing device including functionality for communicating (e.g., remotely) over a computer network. The client system 930 may be a desktop computer, laptop computer, personal digital assistant (PDA), in- or out-of-car navigation system, smart phone or other cellular or mobile phone, or mobile gaming device, among other suitable computing devices. The client system 830 may execute one or more client applications, such as a Web browser.

When a user at the client system 830 desires to view a particular webpage (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, a timestamp identifying when the request was transmitted, and/or location information identifying a geographic location of the user's client system 830 or a logical network location of the user's client system 830.

Although the example network environment 800 described above and illustrated in FIG. 8 is described with respect to the social networking system 820a and the gaming platform 820b, this disclosure encompasses any suitable network environment using any suitable systems. For example, a network environment may include online media systems, online reviewing systems, online search engines, online advertising systems, or any combination of two or more such systems.

Figure 9:
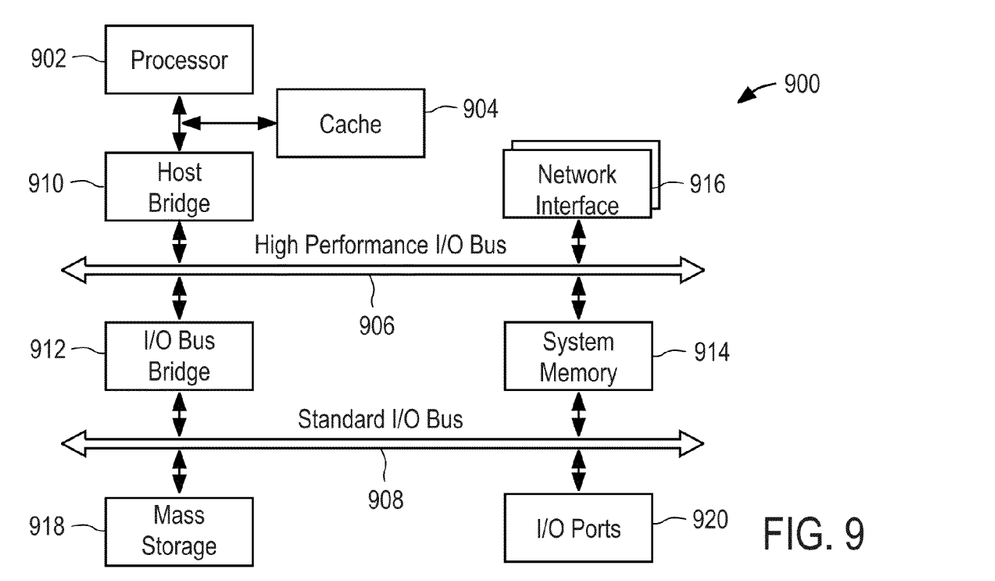
FIG. 9 illustrates an example computer system architecture.

FIG. 9 illustrates an example computing system architecture, which may be used to implement a server 922 or a client system 930. In one embodiment, the hardware system 900 comprises a processor 902, a cache memory 904, and one or more executable modules and drivers, stored on a tangible computer-readable storage medium, directed to the functions described herein. Additionally, the hardware system 900 may include a high performance input/output (I/O) bus 906 and a standard I/O bus 908. A host bridge 910 may couple the processor 902 to the high performance I/O bus 906, whereas the I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. Mass storage 918 and I/O ports 920 may couple to the bus 908. The hardware system 900 may optionally include a keyboard, a pointing device, and a display device (not shown) coupled to the bus 908. Collectively, these elements are intended to represent a broad category of computer hardware systems.

The elements of the hardware system 900 are described in greater detail below. In particular, the network interface 916 provides communication between the hardware system 900 and any of a wide range of networks, such as an Ethernet (e.g., IEEE 802.3) network, a backplane, etc. The mass storage 918 provides permanent storage for the data and programming instructions to perform the above-described functions implemented in servers 922 of FIG. 9, whereas system memory 914 (e.g., DRAM) provides temporary storage for the data and programming instructions when executed by the processor 902. I/O ports 920 are one or more serial and/or parallel communication ports that provide communication between additional peripheral devices, which may be coupled to the hardware system 900.

The hardware system 900 may include a variety of system architectures and various components of the hardware system 900 may be rearranged. For example, cache memory 904 may be on-chip with the processor 902. Alternatively, the cache memory 904 and the processor 902 may be packed together as a "processor module," with processor 902 being referred to as the "processor core." Furthermore, certain embodiments of the present disclosure may neither require nor include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the system and the hardware components of the system. Any suitable operating system may be used.

Figure 10:
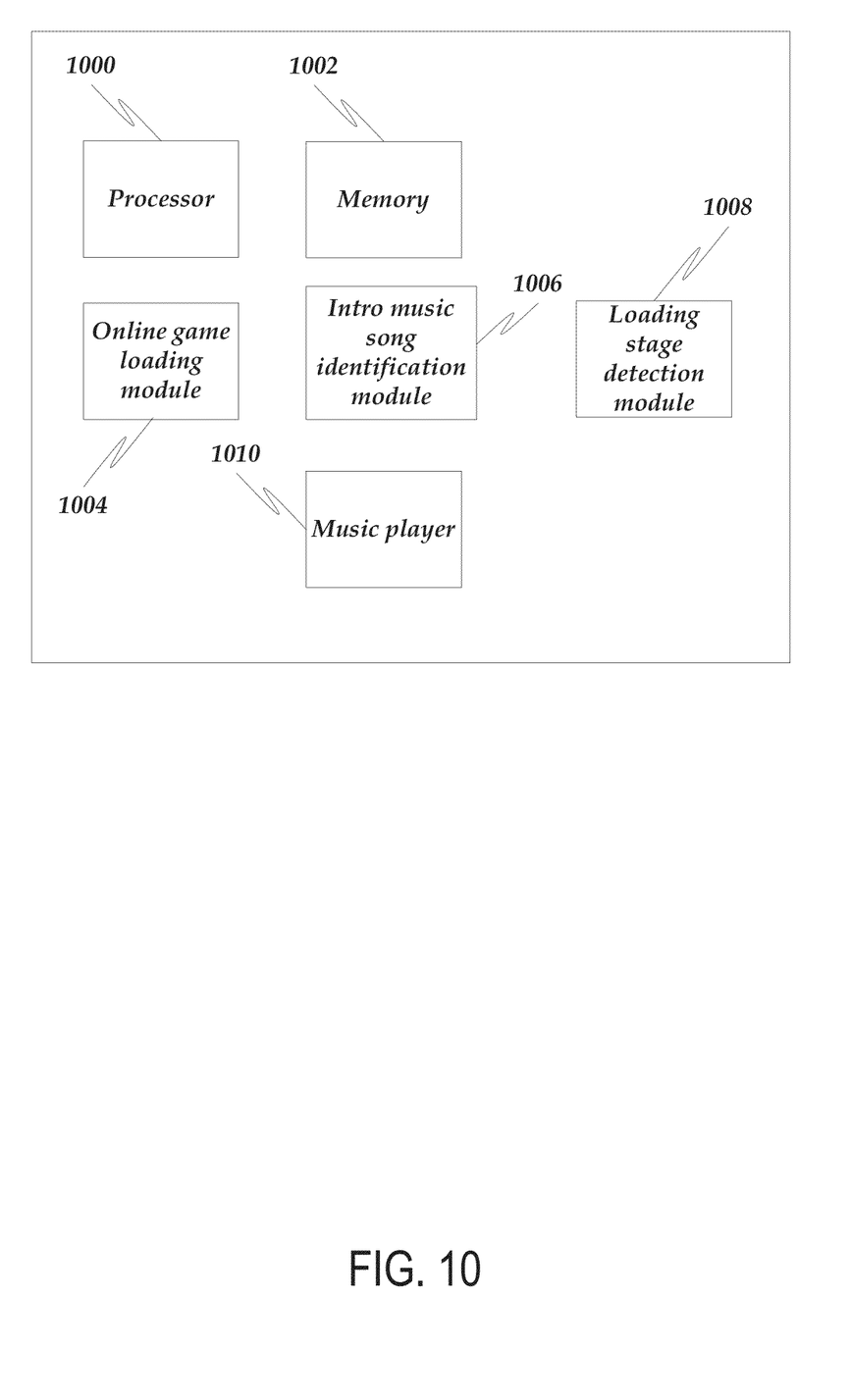
FIG. 10 illustrates an example client system architecture.

FIG. 10 illustrates an example client system suitable for operating one or more embodiments of the intro music aspect. The client system may include at least a processor 1000 and a memory 1002. Additionally, an online game loading module 1004 is provided to load an online game on the client system. An intro music song identification module 1006 can then identify one or more songs as intro music songs. A loading stage detection module 1008 then is able to detect current stage of loading of the online game loading module. If the current stage is a stage where interactivity between the online game and a user is possible, then a music player 1010 is instructed to continue to play the currently playing song of the intro music songs until it has finished.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:
1. A method, comprising:
identifying one or more songs as intro music songs;
upon the beginning of the loading of an online game by a client system, during a first stage of loading, causing the client system to play one or more of the one or more intro music songs;
upon advancing to a second stage of loading, causing the client system to play a different one or more of the one or more intro music songs;
wherein the songs played for the second stage of loading have song lengths that are less than or equal to a predefined song length limit, wherein the predefined song length limit is selected dynamically at runtime so as to minimize the amount of time that a particular intro song would continue to play until finishing if the online game loads to the extent that interactivity between the online game and a user of the client system is possible while the particular intro song is playing based on how much time is estimated for the second stage of loading to complete;
detecting when the online game has loaded to the extent that interactivity between the online game and a user of the client system is possible;
determining one or more game songs corresponding to gameplay while interactivity between the online game and the user is possible, wherein the one or more game songs do not include the one or more intro music songs; and
permitting interactivity between the online game and the user while continuing to play a currently playing song from the intro music songs, wherein the currently playing song continues to play until the currently playing song has finished, at which point one or more of the game songs corresponding to gameplay while interactivity between the online game and the user is possible plays.

2. The method of claim 1, wherein the one or more songs are saved as separate digital audio files.

3. The method of claim 2, wherein the one or more songs are saved on the client system.

4. The method of claim 2, wherein the one or more songs are saved on a server system.

5. The method of claim 1, wherein the intro songs are played in a sequence.

6. The method of claim 5, wherein the sequence is predefined by a game designer.

7. The method of claim 5, wherein the sequence is dynamically determined when the user of the client system requests that the online game be played.

8. The method of claim 7, wherein the dynamic determination of the sequence is based on environmental factors.

9. The method of claim 1, wherein the loading comprises a plurality of stages being performed prior to a stage at which interactivity between the online game and a user of the client system is possible, and wherein a sequence of intro music songs to be played differs for each of the plurality of stages.

10. The method of claim 9, wherein a sequence of intro music songs to be played for the one of the plurality of stages being performed closest to the stage at which interactivity between the online game and a user of the client system is possible is designed to elicit more anticipation than a stage just prior to the one of the plurality of stages.

11. A system comprising:
a client system including:
a processor;
an online game loading module configured to load on online game on the client system;
an intro music song identification module configured to identify one or more songs as intro music songs;

a loading stage detection module configured to detect a current stage of loading of the online game loading module; and a music player configured to, upon the beginning of a first stage of the loading of an online game by the online game loading module, cause the client system to play the one or more intro music songs, determine one or more game songs corresponding to gameplay while interactivity between the online game and the user is possible, wherein the one or more game songs do not include the one or more intro music songs, and further configured to, when the loading stage detection module detects that the online game has completed a second stage of the loaded by having been loaded to the extent that interactivity between the online game and a user of the client system is possible, continue to play a currently playing song until the currently playing song has finished, while the client system permits interactivity between the online game and the user, at which point one or more of the game songs corresponding to gameplay while interactivity between the online game and the user is possible plays; and wherein the songs played for the second stage of loading have song lengths that are less than or equal to a predefined song length limit, wherein the predefined song length limit is selected dynamically at runtime so as to minimize the amount of time that a particular intro song would continue to play until finishing if the online game loads to the extent that interactivity between the online game and a user of the client system is possible while the particular intro song is playing based on how much time is estimated for the second stage of loading to complete.

12. The system of claim 11, wherein the client system is a mobile device.

13. The system of claim 11, wherein the client system is a laptop computer.

14. The system of claim 11, wherein the client system is a desktop computer.

15. The system of claim 11, further comprising a server system configured to interact with the client system to play the online game once the online game has loaded on the client system.

16. The system of claim 11, wherein one or more of the intro music songs are stored on the server system.

17. The system of claim 11, further comprising a sequence determiner configured to dynamically determine a sequence for the music player to play the intro music songs.

18. The system of claim 17, wherein the sequence determiner is configured to examine environmental factors in determining the sequence.

19. A non-transitory program storage device, tangibly embodying a set of computer program instructions executable to perform a method comprising:

identifying one or more songs as intro music songs;

upon the beginning of the loading of an online game by a client system, during a first stage of loading, causing the client system to play one or more of the one or more intro music songs;

upon advancing to a second stage of loading, causing the client system to play a different one or more of the one or more intro music songs;

wherein the songs played for the second stage of loading have song lengths that are less than or equal to a predefined song length limit, wherein the predefined song length limit is selected dynamically at runtime so as to minimize the amount of time that a particular intro song would continue to play until finishing if the online game loads to the extent that interactivity between the online game and a user of the client system is possible while the particular intro song is playing based on how much time is estimated for the second stage of loading to complete;

detecting when the online game has loaded to the extent that interactivity between the online game and a user of the client system is possible;

determining one or more game songs corresponding to gameplay while interactivity between the online game and the user is possible, wherein the one or more game songs do not include the one or more intro music songs;

and permitting interactivity between the online game and the user while continuing to play a currently playing song from the intro music songs, wherein the currently playing song continues to play until the currently playing song has finished, at which point one or more of the game songs corresponding to gameplay while interactivity between the online game and the user is possible plays.

\* \* \* \* \*